United States Patent [19]
Camp

[11] 3,788,437
[45] Jan. 29, 1974

[54] CLUTCH RELEASE BEARING
[75] Inventor: John W. A. Camp, Colchester, England
[73] Assignee: Ford Motor Company, Dearborn, Mich.
[22] Filed: Jan. 21, 1972
[21] Appl. No.: 219,654

[30] Foreign Application Priority Data
Feb. 4, 1971    Great Britain...................... 3,862/71

[52] U.S. Cl.................................... 192/98, 308/184
[51] Int. Cl........................ F16d 23/14, F16d 27/00
[58] Field of Search....................................... 192/98

[56] References Cited
UNITED STATES PATENTS
3,416,637   12/1968   Maurice............................... 192/98
3,604,545   9/1971    Bourgeois............................ 192/98
3,625,327   12/1971   Birdsey................................ 192/98

Primary Examiner—Benjamin W. Wyche
Attorney, Agent, or Firm—Keith L. Zerschling; Clifford L. Sadler

[57] ABSTRACT

A clutch release mechanism having a self-centering clutch release bearing assembly. The bearing assembly has one portion engaging the clutch release fingers of a clutch pressure plate assembly and another portion engaging a bearing carrier. A split spring ring is interposed between the bearing and the carrier. The bearing is supported for limited radial movement and the spring urges the bearing into engagement with the bearing carrier.

5 Claims, 1 Drawing Figure

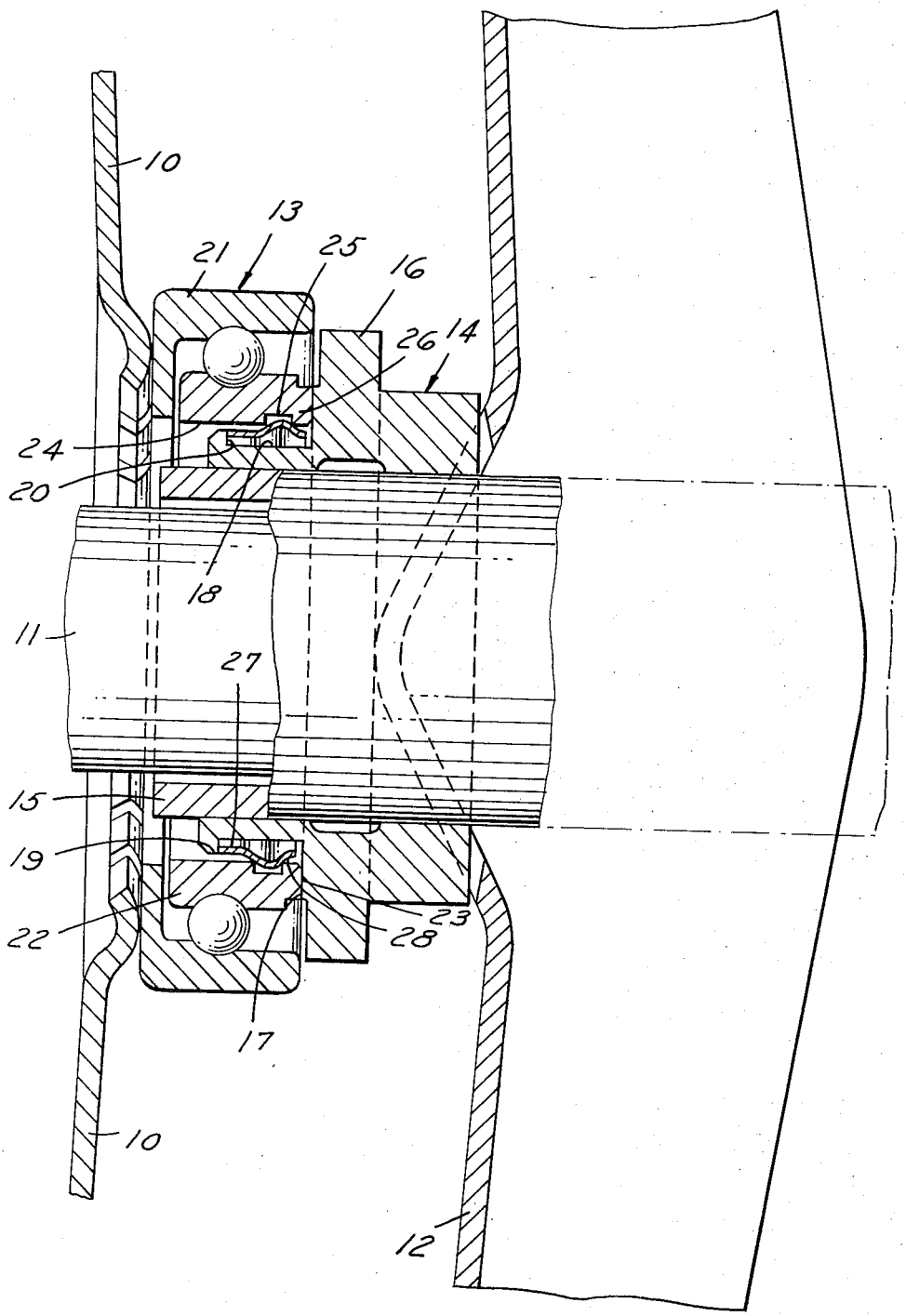

CLUTCH RELEASE BEARING

BACKGROUND OF THE DISCLOSURE

This invention relates to a self-centering clutch release bearing assembly. The bearing assembly of the invention is particularly useful in diaphragm clutches for motor vehicles.

It is well known that misalignment between the pressure plate assembly of a clutch and its clutch release bearing can cause excessive wear and noise. I have discovered a clutch release bearing with limited free movement radially of its carrier that will center itself and reduce wear and noise.

BRIEF DESCRIPTION OF THE DISCLOSURE

In one embodiment of this invention a clutch release bearing assembly has the following features:
a. a clutch release bearing has limited radial movement relative to a bearing carrier so that in use it centers itself about the axis of rotation of the clutch; and
b. a split spring ring positioned in compression between the bearing carrier and an inner race that is in pressure contact with a forwardly facing and radially extending surface of the bearing carrier.

In use, the clutch release bearing centers itself relative to the clutch and is retained in the centered position in part by friction between the spring ring and the carrier.

BRIEF DESCRIPTION OF THE DRAWING

The invention will now be described with reference to the accompanying drawing, which is an elevational view, partly in section, of a portion of a motor vehicle clutch including a clutch release bearing assembly embodying the invention.

A DETAILED DESCRIPTION OF THE PREFERRED EMBODIMENT

A motor vehicle clutch has a diaphragm spring 10, an output shaft 11 and a release lever 12. A clutch release bearing 13 is mounted on a bearing carrier 14 which is slidably along a sleeve 15 fixed to a gearbox (not shown).

The bearing carrier 14 is formed with a radially extending flange 16. The release lever 12 acts against the rear of the flange 16. A radially extending and forwardly facing surface 17 is formed on the carrier 14 adjacent the flange 16. A groove 18 in the carrier adjoins the surface 17 and has a forward shoulder 19 with a radially extending and rearwardly facing surface 20.

The clutch release bearing 13 is of the kind in which an outer race 21 is arranged to contact the inwardly extending release fingers of the diaphragm spring 10. The bearing 13 has an inner race 22 which is supported on the carrier 14. The inner race 22 has a rear surface 23 in face to face contact with the surface 17 of the carrier. There is sufficient clearance between the shoulder 19 and the inner periphery 24 of the inner race to permit limited movement of the bearing 13 relative to the bearing carrier 14.

A groove 25 is formed in the inner periphery 24 of the inner bearing race 22. The groove 25 has a rear shoulder 26.

A split ring 27 of resilient material such as spring steel, is disposed in the groove 18 and interposed between the carrier shoulder 19 and the inner race shoulder 26. The ring 27 is formed either with a uniform section having a conical surface 28 or with a number (such as three) of locating formations having a rearwardly inclined surface (similar to surface 28) for contacting the rear shoulder 26 of the groove 25.

The split spring ring 27 is compressed inwardly when the bearing 13 is assembled with the carrier 14 so that in use it is in resilient contact with the shoulder 26 of the inner race 22. The inclined surface or surfaces 28 thus urge the bearing 13 rearwardly into pressure contact with the carrier surface 17 of bearing carrier 14. The spring ring 27 reacts against the radially extending and rearwardly facing surface 20 of the shoulder 19. Friction between the contacting faces 23 and 17 of the inner race 22 and carrier 14, respectively, and between the spring ring 27 and the rearwardly facing surface 20 of carrier 14 resists radial movement of the bearing 13 relative to the carrier 14.

OPERATION

In operation, the bearing 13 centers itself about the axis of rotation of the diaphragm spring 10 and misalignment between the clutch and the gearbox, within the limits of relative radial movement of the bearing 13 and carrier 14, is accommodated.

The arrangement described above is particularly suitable for use with a clutch release mechanism which maintains a light pressure of the clutch release bearing against the diaphragm spring when the clutch is engaged.

I claim:
1. A clutch release mechanism comprising a clutch pressure plate assembly, having inwardly directed clutch release fingers,
   a release bearing having an outer race engaging said fingers,
   an axially displaceable bearing carrier with a radial surface,
   said bearing having an inner race engaging said radial surface of said bearing carrier,
   an annular split spring interposed between said carrier and said inner race,
   said spring being radially resilient and constructed to exert a radial force on said inner race urging said inner race in an axial direction into engagement with said radial surface of said carrier.

2. A clutch release mechanism comprising a clutch pressure plate assembly having inwardly directed clutch release fingers,
   a release bearing having an outer portion engaging said fingers,
   an axially displaceable bearing carrier with a radial surface,
   said bearing having an inner portion engaging said radial surface of said bearing carrier,
   said bearing being radially displaceable with respect to said carrier,
   an annular split spring interposed between said carrier and said inner portion,
   said spring being radially resilient and constructed to exert a radial force on said inner portion urging said inner portion in an axial direction into engagement with said carrier.

3. A clutch release mechanism according to claim 2 and further comprising:
   said spring comprising a split spring metal ring.

4. A clutch release mechanism comprising a clutch pressure plate assembly having inwardly directed clutch release fingers,
- a release bearing having an outer portion engaging said fingers,
- an axially displaceable bearing carrier with a radial surface,
- said bearing having an inner portion engaging said radial surface of said bearing carrier,
- said bearing being radially displaceable with respect to said carrier,
- an annular spring interposed between said carrier and said inner portion,
- said carrier having an annular portion disposed within said inner portion of said bearing,
- said annular portion having a shoulder formed at one end spaced from said radial surface of said carrier,
- said inner portion having a shoulder,
- said spring having one portion engaging the shoulder of said bearing carrier and a second portion engaging the shoulder of said inner portion of said bearing,
- said spring being radially resilient and constructed to exert a radial force on said inner portion urging said inner portion in an axial direction into engagement with said radial surface of said carrier.

5. A clutch release mechanism comprising a clutch pressure plate assembly having inwardly directed clutch release fingers,
- a release bearing having an outer portion engaging said fingers,
- an axially displaceable bearing carrier with a radial surface,
- said bearing having an inner portion engaging said radial surface of said bearing carrier,
- said bearing being radially displaceable with respect to said carrier,
- an annular spring interposed between said carrier and said inner portion,
- said spring comprising a split spring metal ring,
- said carrier having a shoulder at one end spaced from said radial surface of said carrier,
- said inner portion of said bearing having a shoulder spaced from said shoulder of said carrier,
- said spring having one portion engaging the shoulder of said bearing carrier and a sloping incline surface engaging the shoulder of said inner portion of said bearing,
- said spring being radially resilient and constructed to exert a radial force on said inner portion urging said inner portion in an axial direction into engagement with said radial surface of said carrier.

* * * * *